US006772068B2

(12) United States Patent
Laake (10) Patent No.: US 6,772,068 B2
(45) Date of Patent: Aug. 3, 2004

(54) QUALITY CONTROL OF DATA (76) Inventor: Andreas Laake, 37 Tudor Dr., Kingston Upon Thames, Surrey KR2 5BW (GB)

(*) Notice: Subject to any disclaimer, the term of this patent is extended or adjusted under 35 U.S.C. 154(b) by 0 days.

(21) Appl. No.: 10/311,064

(22) PCT Filed: Jun. 27, 2001

(86) PCT No.: PCT/IB01/01158
§ 371 (c)(1),
(2), (4) Date: Dec. 13, 2002

(87) PCT Pub. No.: WO02/01252
PCT Pub. Date: Jan. 3, 2002

(65) Prior Publication Data
US 2003/0182064 A1 Sep. 25, 2003

(30) Foreign Application Priority Data
Jun. 30, 2000 (GB) .............................................. 0015974

(51) Int. Cl.⁷ ................................................. G01V 1/28

(52) U.S. Cl. ............................................. 702/14; 702/2
(58) Field of Search ............................... 702/14, 16, 17, 702/2; 367/72, 73, 47

(56) References Cited

U.S. PATENT DOCUMENTS 6,049,760 A * 4/2000 Scott ........................... 702/14

* cited by examiner

Primary Examiner—John Barlow
Assistant Examiner—Victor J Taylor
(74) Attorney, Agent, or Firm—David S. Figatner; Williams, Morgan & Amerson (57) ABSTRACT

A method of monitoring the quality of data is disclosed. The method includes sampling a first acquired data trace to determine the amplitude of the trace at a plurality of sampling times; and determining first and second attributes for the acquired first data trace from the sampled amplitudes of the first acquired data trace, the first and second attributes being indicative of the noise content of the first acquired data trace.

18 Claims, 5 Drawing Sheets

QUALITY CONTROL OF DATA

BACKGROUND OF THE INVENTION

1. Field of the Invention

The present invention relates to a method of monitoring the quality of acquired data. In particular, the present invention relates to a method of monitoring the quality of seismic data that can be carried out while seismic data is being acquired, so as to provide on-line quality control of the acquired data.

2. Description of the Related Art

It is highly desirable to provide quality control of data acquired during seismic exploration in real-time. By "real-time" is meant that the results of the quality control are produced at substantially the same rate that data is acquired; this is also known as "on-line" quality control. Providing on-line quality control during a seismic survey enables any deterioration in quality of the acquired seismic data that might occur during the survey, for example as a result of the onset of a fault in a seismic source or a seismic receiver, to be detected and investigated while the survey is still in progress. In the absence of on-line quality control such a deterioration in the quality of the data would only become apparent once the data was analysed after the completion of the survey. In order to perform quality control on-line it is necessary to minimise the amount of computation required to perform the quality control, owing to the large amount of data that is acquired in a typical seismic survey.

Figure 1:
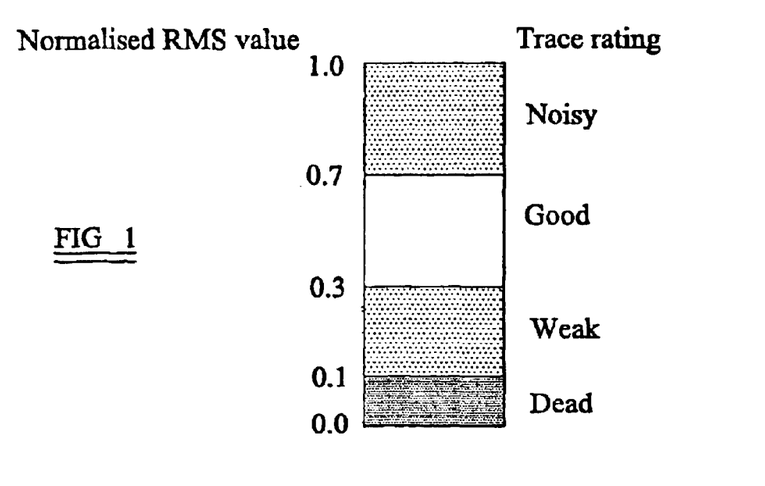
FIG. 1 is a schematic illustration of a prior art method of on-line quality control of seismic data.

A known method of providing on-line quality control of seismic data is based on determining the route-mean-square (RMS) amplitude of a seismic data trace. The RMS amplitude of a seismic data trace is a characteristic of the energy of the trace. Such a prior art on-line quality control method is illustrated schematically in FIG. 1. It can be seen that threshold levels are set for the normalised RMS amplitude of a seismic data trace, and the thresholds are used to classify a trace. In the example of FIG. 1, a trace having a normalised RMS amplitude between 0.0 and 0.1 is classified as a "dead" trace, a trace having a normalised RMS amplitude in the range 0.1 to 0.3 is classified as a "weak" trace, and a trace having a RMS amplitude in the range 0.7 to 1.0 is classified as a "noisy" trace. Acceptable traces have a RMS amplitude value in the range 0.3 to 0.7.

The RMS amplitudes of data traces are normalised using, for example, the expected amplitude of a data trace in a particular survey geometry having regard to the energy of the seismic source.

This prior art method of on-line quality control monitors only the RMS amplitude of the seismic data traces acquired in a seismic survey. The RMS amplitude of a seismic data trace is indicative of the energy of the seismic data, so that this prior art method monitors only the energy of the seismic data traces. Hence, the classification of the traces into "dead", "weak", "good" and "noisy" traces is based solely on the strength of the signal, and does not provide any information as to whether or not the signal is useful. Moreover, it is not possible for this prior art method to provide on-line monitoring of further characteristics of the seismic data, because the amount of computation that this would require could not be carried out at the same rate as the seismic data was acquired.

SUMMARY OF THE INVENTION

The present invention provides a method of monitoring the quality of data comprising the steps of: sampling a first data trace to determine the amplitude of the trace at a plurality of sampling times; and determining first and second attributes for the first data trace from the sampled amplitudes of the first data trace, the first and second attributes being indicative of the noise content of the first data trace.

The method of the present invention enables two or more attributes that relate to the noise content of the acquired data traces to be monitored on-line. This provides improved quality control compared with the prior art method that monitors just the energy of the data traces.

The method of the present invention involves sampling a data trace to determine the amplitude of the trace at intervals after the start time of the trace. (In the case of a seismic data trace, for example, this generally corresponds to the time at which the seismic source is actuated). Thus, the invention requires only time domain processing, and does not require frequency domain processing. This reduces the amount of computation required to determine the attributes of the data, and so allows the method of the invention to monitor more than one attribute of the data.

In a preferred embodiment, the method comprises the further step of comparing one of the first and second attributes determined for the first data trace with a predetermined threshold value. This provides information about the quality of the data trace relative to a pre-set threshold.

In an alternative embodiment, the method comprises the further steps of: sampling a second data trace to determine the amplitude at a plurality of sampling times; determining the first and second attributes for the second data trace from the sampled amplitudes of the second data trace; and comparing at least one of the first and second attributes determined for the first data trace with the corresponding one(s) of the first and second attributes determined for the second data trace. This embodiment provides a measure of the relative quality of the first and second data traces. If the first and second data traces are, for example, seismic data traces that were acquired in the same shot, this comparison provides information about the relative quality of traces within a shot; alternatively if the first and second data traces are, for example, seismic data traces that were acquired in different shots this comparison provides information about the relative quality of traces from different shots.

In a preferred embodiment, the or each data trace is a seismic data trace.

Preferred features of the present invention are set out in the dependent claims.

BRIEF DESCRIPTION OF THE DRAWINGS

Preferred embodiments of the present invention will now be described in detail by way of illustrative example with reference to the accompanying figures in which.

DETAILED DESCRIPTION OF THE INVENTION

Figure 2:
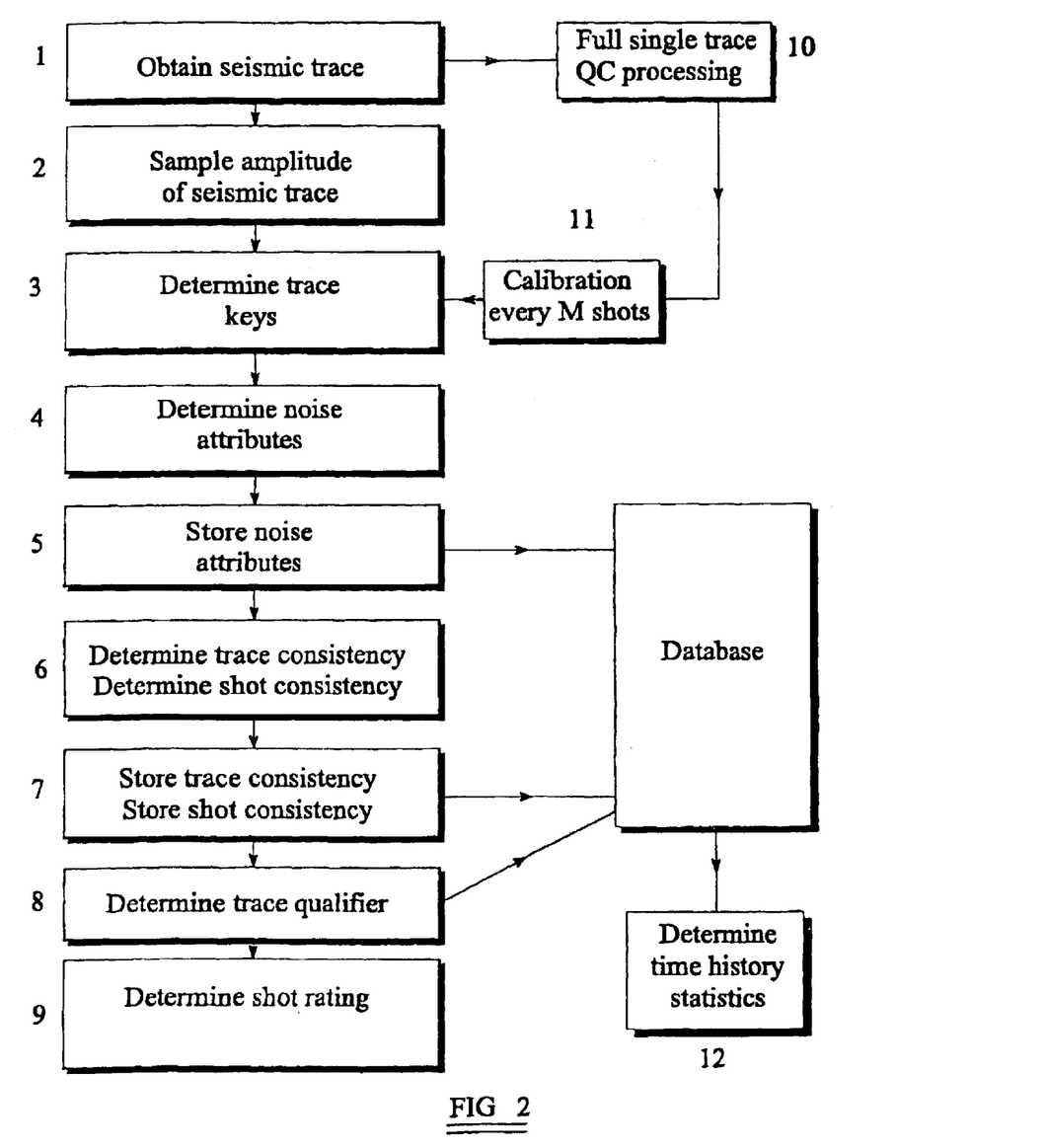
FIG. 2 is a flow diagram illustrating an embodiment of the present invention.

A method according to one embodiment of the present invention is shown schematically in the flow chart of FIG. 2. This figure illustrates a method of monitoring on-line the quality of a series of seismic data traces. Initially at step 1 a seismic data trace is obtained, and at step 2 the seismic trace is sampled. In the sampling process, the amplitude of the trace is measured for predetermined times from the start of the trace. The interval between successive sampling operations is preferably constant, so that the interval between any two successive sampling operations defines a sampling frequency F, which is simply the inverse of the time interval between adjacent sampling operations. The sampling step produces a set of pair of values $(t_i, x_i)$, where $x_i$ is the sampled amplitude of the trace at time $t_i$. The set of $(t_i, x_i)$ for a trace are stored.

For a typical seismic trace having a duration of 5 to 20 seconds a suitable interval between successive sampling operations would be 2 ms or 4 ms, corresponding to a sampling frequency of 500 Hz or 250 Hz respectively.

From the results of sampling the amplitude of the seismic data trace, characteristics of the seismic data trace are determined at step 3. These are known as "trace keys". As will be discussed below, these trace keys represent features such as the RMS amplitude of the trace, or the high or low frequency content of the trace.

At step 4, attributes that are indicative of the noise level in the seismic trace are determined from the trace keys. As will be discussed below, it is possible to derive noise attributes that relate to, for example, the spike content of the seismic trace, or the low or high frequency component of the seismic data trace.

Once the trace attributes have been determined they are stored in a suitable database at step 5.

Figure 3:
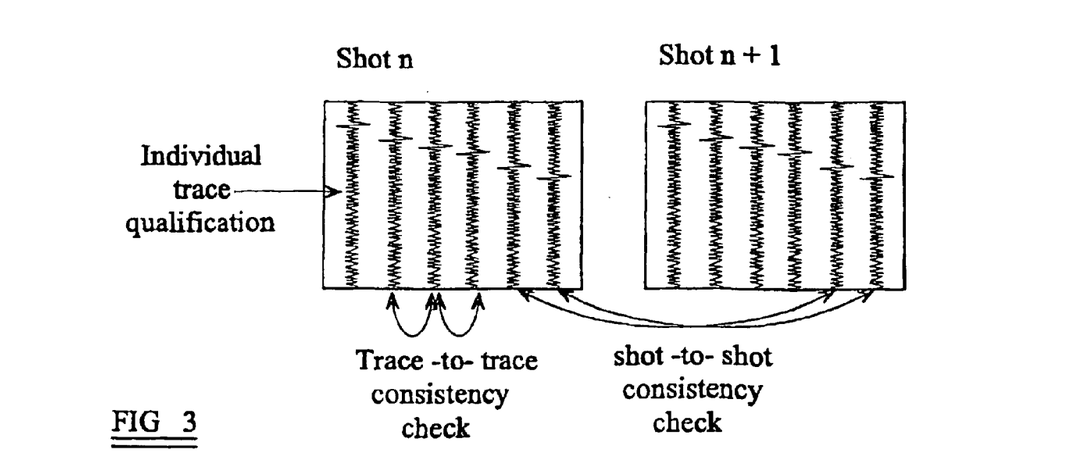
FIG. 3 illustrates the use of the present invention to monitor the consistency of seismic data traces with one another.

Steps 1 to 5 are then repeated for a second seismic data trace, to determine and store the trace attributes for a second data trace. It is now possible to monitor the quality of the acquired seismic data by comparing the attributes of the second trace with the attributes of the first trace at step 6. The first and second traces may relate to the same shot, in which case a comparison of the attributes of the two traces provides information about the consistency of traces within a single shot. Accordingly, the two traces may relate to different shots, in which case the comparison of their attributes provides information about the consistency of the data between successive shots. These two possibilities are illustrated schematically in FIG. 3.

The results of the comparisons of the attributes of the first and second databases may also be stored in a suitable database, at step 7.

At step 8 the "trace qualifier" is determined. The trace qualifier of a trace is derived from all the attributes determined for a trace, and provides an overall rating of an individual trace.

At step 9 the "shot rating" is determined. The shot rating is derived from the trace qualifiers of all traces in a shot, and provides an overall rating of an entire shot.

In addition to comparing the trace noise attributes of the first trace with the trace noise attributes of the second seismic data trace, it is possible to compare the trace noise attributes of either of the data traces with predetermined thresholds. This provides an indication as to whether the quality of the seismic data meets the desired levels. This enables the data acquired for a particular shot to be given a quality rating that relates to the quality of the data as measured against the pre-set thresholds.

The method of the invention of providing on-line quality control of seismic data preferably includes means for checking that the trace keys derived by sampling the seismic data traces are accurate representations of the actual trace keys of the trace. In the embodiment of FIG. 2 this checking is done by carrying out a full quality control processing of the seismic data at step 10, and the trace keys derived from the process of sampling the seismic data traces are compared with the results of this full quality control processing of the seismic data at step 11. The amount of computation required to carry out a full quality control processing of the seismic data means that it is not possible to do this in real-time for every trace, so it can be done only for selected shots, in the embodiment of FIG. 2 for every $M^{th}$ shot. M is typically equal to 50.

A further feature of the invention is that, because the attributes derived for the seismic data traces and the results of the trace consistency and shot consistency comparisons are stored in a database, it is possible to monitor how the trace attributes, for example, vary over time. Once data for sufficient traces has been stored, it is possible to predict the noise attributes of future traces from the stored data at step 12.

One embodiment of a method for determining the trace keys and the trace attributes of a seismic data trace will now be described in detail.

The first step of determining the trace keys for a seismic data trace is to sample the seismic data trace and obtain measurements of the amplitude of the seismic data trace. The amplitude measured by the $i^{th}$ sampling operation will be denoted as $x_i$. The index i runs from 1 to N, where N is the total number of times that the trace was sampled.

In this embodiment, the time interval between each sampling operation is constant, and the reciprocal of this time interval defines a sampling frequency F.

Once the seismic data trace has been sampled, the sampled amplitudes are used to define the values of a plurality of functions of the sample amplitudes. These functions are known hereinafter as "trace key values". The functions can involve, for example, the RMS average of the sampled amplitudes, the derivative with respect to time of the sampled amplitudes, or the integral with respect to time of the sampled amplitudes.

In this embodiment, four trace key values are calculated, using the following formulas:

$$RMS = \sqrt{\frac{1}{N} \sum_{i=1}^{N} x_i^2} \quad (1)$$

$$MAX = \sqrt{\max(x_i^2)} \quad (2)$$

$$RLOF = F \sqrt{\frac{1}{N} \sum_{i=1}^{N} \left( \int_{x_i} dt \right)^2} \quad (3)$$

$$RHIF = \frac{1}{F}\sqrt{\frac{1}{N}\sum_{i=1}^{N}\left(\frac{d}{dt}x_1\right)^2} \quad (4)$$

The first trace key, RMS, is the RMS (route-mean-square) average of the amplitudes measured in the sampling operations on the seismic data trace. The trace key RMS is a measure of the RMS amplitude of the seismic data trace.

The second trace key, MAX, is a measure of the maximum amplitude of the seismic data trace. It is determined by squaring the sampled amplitudes, and taking the square root of the largest resultant value.

The third and fourth trace keys RLOF and RHIF are measures of the low frequency signal components contained in the seismic data trace and the high frequency signal components contained in the seismic data trace, respectively. It will be seen that the value RHIF is obtained from the time derivative of the sampled trace, and that the value RLOF is obtained from the integral with respect of time of the sampled amplitudes. The differential with respect to time corresponds to a multiplication by frequency in the frequency domain, whereas integration with respect to time corresponds to a division by the frequency in the frequency domain. Accordingly, the differential with respect to time used in the calculation of the RHIF value will attenuate the signal at low frequencies and amplify the signal at high frequencies. Thus, the trace key RHIF which contains the RMS value of the time derivative provides a measure of the high frequency content of the seismic data trace.

Conversely, the integral with respect to time, which corresponds to a division by the frequency in the frequency domain, amplifies the signal at low frequencies and attenuates the signal at high frequencies. Thus, the trace key RLOF which contains the integral of the sampled amplitudes with respect to time provides a measure of the low frequency content of the seismic data trace.

Figure 4:
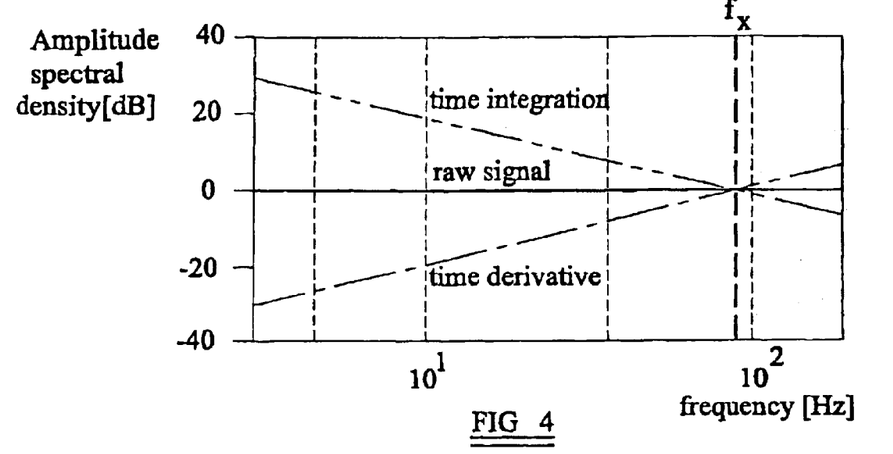
FIG. 4 shows the relationship between the amplitude spectral density and the frequency.

FIG. 4 is a schematic illustration showing how integrating with respect to time amplifies the low frequency content of the raw signal and attenuates the high frequency content of the raw signal, whereas differentiating with respect to time attenuates the low frequency content of the raw signal and amplifies the high frequency content of the raw signal.

It will be seen that calculating the trace key RLOF comprises the multiplication by the sampling frequency F, and that calculating the trace key RHIF comprises division by the sampling frequency F. This is done in order to provide equal magnitude levels for the values RMS, RLOF and RHIF.

The trace key values described above are determined from RMS amplitude values that are obtained by processing the seismic data in the time domain, by sampling the seismic data trace. This is possible because Parseval's theorem states that the RMS value can be determined either in the time domain or in the frequency domain, so that it is possible to determine the RMS value in the more convenient of the time domain or frequency domain.

FIG. 4 shows that the RMS value of the time integral of the sampled amplitudes and the RMS value of the time derivative of the sampled values intersect at a frequency $f_x$. The frequency range is therefore split into two frequency bands, namely $f<f_x$ and $f>f_x$. The intersection frequency $f_x$ can be scaled using a scaling factor COR which is related to the sampling frequency F as follows:

$$COR=F/(CONST f_x) \quad (5)$$

In equation (5), CONST is a constant value.

Figure 5:
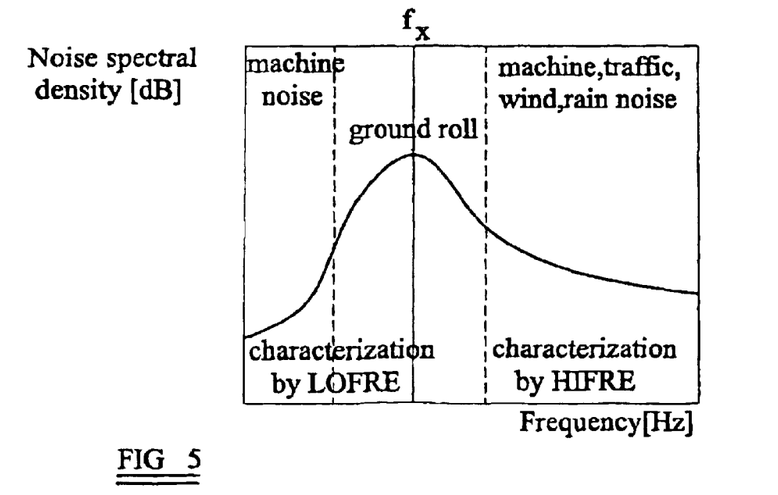
FIG. 5 shows the noise spectral density for a typical seismic trace in the presence of machine noise and ambient noise.

FIG. 5 is a schematic illustration of the spectral density of noise in typical seismic data, plotted as a function of frequency. It will be seen that in the mid-frequency range the predominant noise is ground roll noise. At low frequencies the noise is predominantly machine noise, whereas at high frequencies the noise is predominantly machine or traffic noise, or weather-related noise. It is preferable to scale the intersection frequency $f_x$ so that it is approximately equal to the centre frequency of the frequency range of the ground roll noise. This enables useful information to be obtained about both high frequency and low frequency noise in the trace.

Once the trace keys have been determined, a plurality of attributes indicative of the noise of the seismic data trace are then calculated. These attributes are referred to as "trace noise attributes" hereinafter. In this embodiment of the invention three trace noise attributes are calculated, as follows:

$SPIKE=\sqrt{2} \, RMS/MAX$ $LOFRE=RMS/(RLOF/COR)$ $HIFRE=RMS/(RHIF/COR)$

The noise attribute SPIKE is indicative of the amount of spike noise in the trace. The noise attribute LOFR is indicative of the amount of low frequency noise in the trace, whereas the noise attribute HIFR is indicative of the amount of high frequency noise in the trace.

It is possible to determine the type of signal from knowledge of the three noise attributes SPIKE, LOFR, and HIFR. In this example, this can be done using the following table.

TABLE

| Signal Type | SPIKE | LOFRE | HIFRE |
| --- | --- | --- | --- |
| pure low frequency type | 1 | 0.5 to 1 | 0 to 0.5 |
| spikes | 0 to 0.5 | 0.5 to 1 | 0.5 to 1 |
| low frequency noise | 1 | 0 to 0.5 | 0.5 to 1 |
| high frequency noise | 1 | 0.5 to 1 | 0 to 0.5 |
| sweep | 1 | 0.5 to 1 | 0.5 to 1 |
| low frequency wavelet | 0 to 0.5 | 0 to 0.5 | 0.5 to 1 |

It should be noted that the above table represents simply one example of the way in which the signal type can be determined from the noise attributes of a trace, and other classification systems can be used. In other schemes, the threshold values for the noise attributes do not necessarily need to be in the range from 0 to 1.

Once the noise attributes SPIKE, LOFR, and HIFR have been determined for a trace they are stored, for example on magnetic tape or disk or on other suitable storage media.

The process of determining the trace keys and the trace noise attributes is then repeated for a second trace, and the trace noise attributes of the second trace are also stored. It is then possible to compare the trace noise attributes of the two traces with one another. This provides a measure of the consistency of the two traces with one another. If the two traces relate to the same shot, information is obtained about the consistency of seismic data within the shot. Alternatively, if the two traces are from different shots, a comparison of their noise attributes provides information about the consistency of the acquisition process between shots.

As noted above, the RMS amplitude of a seismic data trace is a measure of the energy of the trace. In a preferred embodiment of the invention, therefore, a comparison is also made between the trace key RMS of the two data traces. This comparison provides information as to whether the energy characteristic of the signal has changed between the traces.

As explained above, the present invention requires a relatively small amount of data to characterise the signals by the noise attributes SPIKE, LOFR, and HIFR. The present invention therefore allows the time evolution of the noise attributes to be monitored, by comparing the behaviour of the noise attributes for traces acquired at different times during the survey. Thereby, even a small degradation of the seismic data traces can be observed, by monitoring the variation of the noise attributes over time. If it is seen that the quality of the seismic data is becoming worse, for example as a result of one of the components of the acquisition system malfunctioning, it is possible to carry out maintenance of the acquisition system to ensure that the acquisition of good quality data is not interrupted.

The step of comparing the noise attributes of one trace with the noise attributes of another trace provides information as to whether the quality of traces in an acquisition is varying from trace to trace. This comparison process, however, does not provide any information as to the absolute quality level of the traces. The invention therefore preferably includes a step of comparing the quality of the traces with pre-set specifications to determine whether the quality of the acquired seismic data traces is acceptable. In one embodiment of the invention this is done by comparing the noise attributes determined for a seismic data trace with pre-set threshold values. The threshold values represent the noise attributes that would be obtained if a reference data trace was processed according to the method of the invention. Depending upon the comparison of the noise attributes obtained for a seismic data trace with the pre-set threshold values, the trace can be specified as "noisy", "good", "weak", or "dead".

The pre-set threshold values can be chosen once the type of the data trace has been determined from the noise attributes of the trace, for example by using table 1.

Since the trace keys for a seismic data trace are determined from the sampled amplitudes of the trace, errors may occur in the trace keys as a result of the sampling process. For example, unless the trace is sampled at exactly the time when it has its maximum amplitude, the trace key MAX will be lower than the actual maximum amplitude of the trace. In order to ensure that the sampling process is leading to reliable values for the trace keys RMS, MAX, RLOF, and RHIF, selected data traces are subjected to a full quality control processing. The values of the trace keys obtained by the full quality control processing of a selected trace are compared with the values obtained by the sampled amplitudes, so that the reliability of the trace keys determined from the sampled amplitudes can be checked. If the trace keys are found to be unsatisfactory the operator is alerted to enable corrective action to be taken. For example, the sampling frequency can be increased to improve the accuracy of the sampling process.

Figure 6:
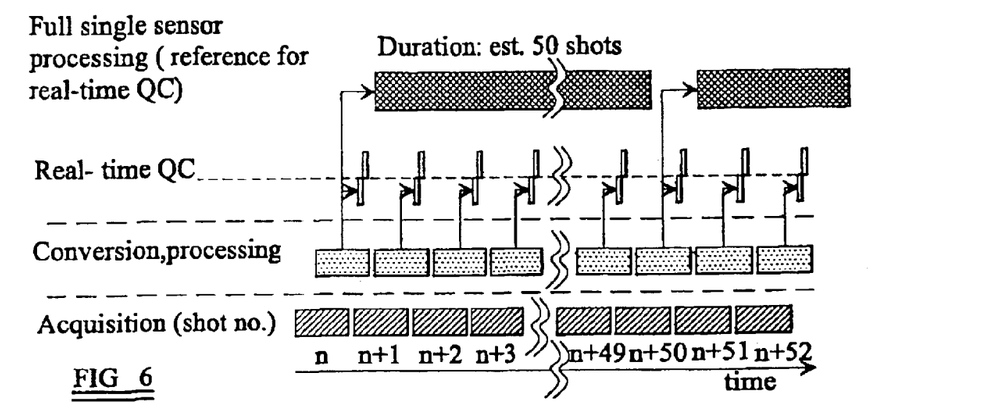
FIG. 6 is a schematic illustration of an overall timing schedule for the method of the present invention.
Figure 7:
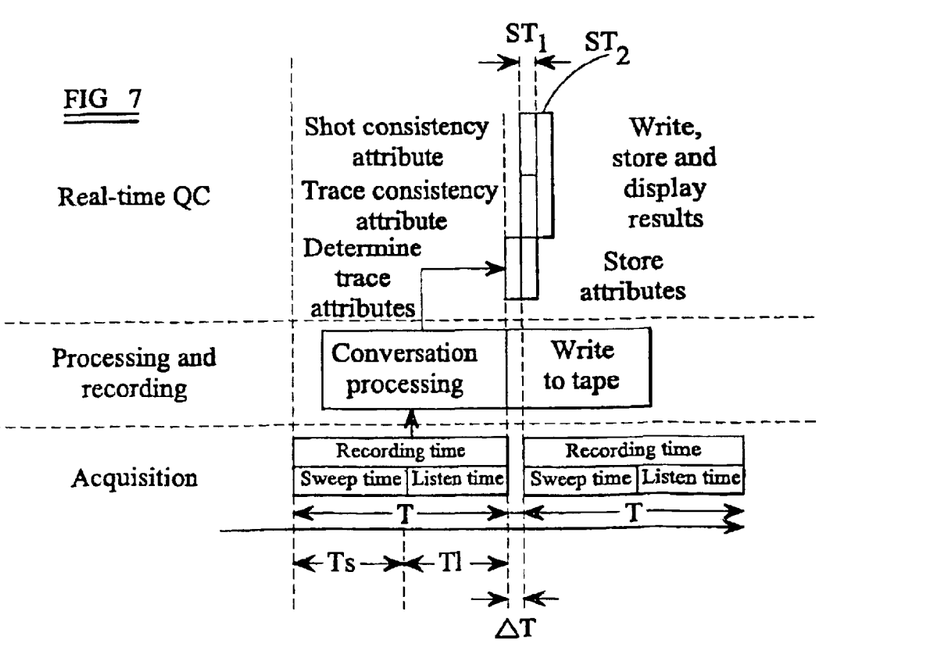
FIG. 7 is a schematic illustration of a detailed timing schedule for a method of the present invention.

The timing sequence of one embodiment of the method of the present invention is illustrated in FIGS. 6 and 7. FIG. 6 gives a general overview of the timing schedule, and FIG. 7 is a detail of part of FIG. 6.

In this embodiment the shots have a constant duration T, and adjacent shots are separated by a time $\Delta T$. The duration of each shot is formed of a sweep time $T_s$ and a listening time $T_L$.

The data acquired in a shot is converted and processed in a conventional manner, and is stored in a suitable storage means such as a magnetic tape or disc. The data is also used for the quality-control method of the present invention, and the noise attributes for the data traces of the $n^{th}$ shot are determined and stored. In the embodiment of the timing scheme shown in FIGS. 6 and 7, the noise attributes of the $n^{th}$ trace are determined in the time interval $\Delta T$ between the end of the $n^{th}$ shot and the start of the $(n+1)^{th}$ shot. In the embodiment of FIGS. 6 and 7 the trace noise attributes of the $n^{th}$ shot are stored in the time period $\delta T_1$ at the start of the $(n+1)^{th}$, but the steps of determining and storing the trace noise attributes of the $n^{th}$ shot could be carried out simultaneously.

Once the trace noise attributes of the traces of the $n^{th}$ shot have been determined, one or more noise attributes of one trace of the $n^{th}$ shot can then be compared with the corresponding noise attribute or attributes of another trace in the $n^{th}$ shot to determine trace consistency attributes for the $n^{th}$ shot. A trace consistency attribute is a measure of the variation in an attribute between one trace and another and can be determined by, for example, calculating the ratio of the value of a noise attributes of one trace to the value of that noise attributes of another one trace.

One or more of the noise attributes for one or more traces of the $n^{th}$ shot can also be compared with the stored value of the corresponding noise attribute(s) for one or more data traces of previous shots, to determine the shot consistency attributes. A shot consistency attribute is a measure of the variation in an attribute between a trace in one shot and a trace in another shot. The calculated values for the trace consistency attributes and the shot constituency attributes are stored, and can also be displayed for example on a VDU so that an operator can monitor the results of the quality control method during the survey.

In the timing chart of FIGS. 6 and 7 the trace consistency attributes and the shot consistency attributes are determined in parallel during the time period $\delta T_1$, and are stored during the time period $\delta T_2$. In principle, however, the trace consistency attributes and the shot consistency attributes could be determined one after the other.

The step of comparing the trace noise attributes with pre-set threshold values is not shown in FIGS. 6 and 7, but this step can be carried out at any time once the trace noise attributes have been determined. Similarly, if it is desired to perform the step of classifying the type of the trace from the trace noise attributes, this can be done at any time once the trace noise attributes have been determined.

It will be seen from FIGS. 6 and 7 that the time required to perform the quality control processing of the present invention is significantly less than the duration of a shot. That is, the present invention provides an on-line quality control method in which the quality of a shot can be determined and displayed to an observer shortly after the completion of the shot.

In the embodiment of FIGS. 6 and 7 full quality control processing is carried out on the data traces of selected shots, to calibrate the quality control method of the invention. In this embodiment the time required to carry out the full quality control processing has been shown as approximately equal to, although slightly less than, the overall duration of fifty shots. The full quality control processing is therefore carried out on the data traces of every fiftieth shot in this embodiment. It should be noted, however, that the invention is not limited to carrying out full quality control processing on every fiftieth shot.

Figure 8:
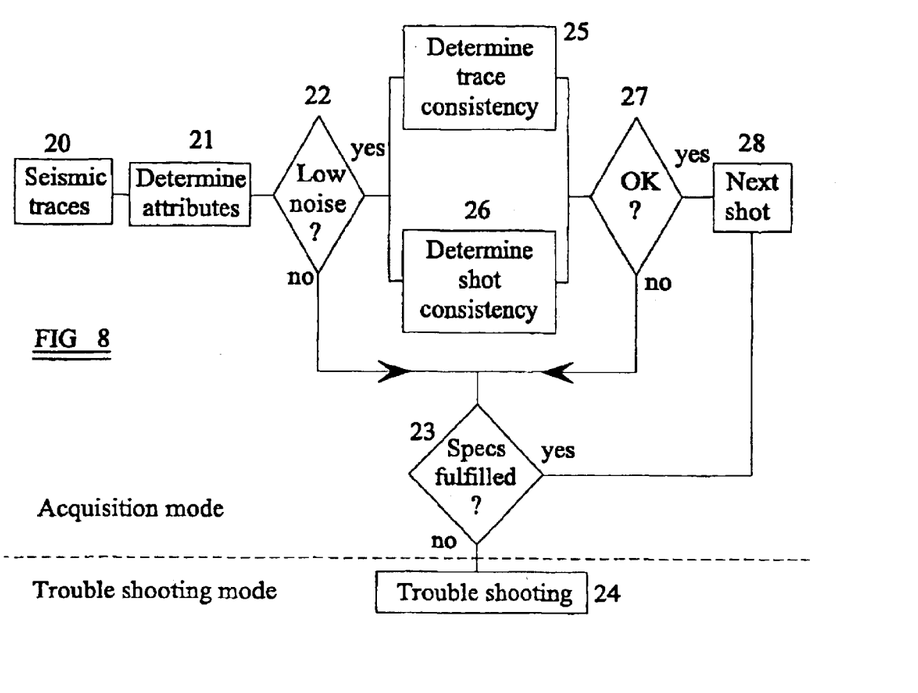
FIG. 8 is a flow diagram illustrating a real-time quality control method incorporating a method of the present invention.

FIG. 8 shows a flow chart of the present invention. At step 20 seismic data traces are obtained in a shot, and at step 21 the noise attributes of the seismic data traces of this shot are determined, for example by the method described above, and stored. At step 22 the noise attributes of the data traces of the $n^{th}$ shot are compared with pre-set noise specifications. If the results of the determination at step 22 is that the traces of the n$^{th}$ shot are classified as "noisy" traces, at step 23 it is determined whether the traces of the n$^{th}$ shot nevertheless satisfy the specifications set down for the acquired seismic data. If there is a yes determination at step 23 the next shot is fired.

If there is a "no" determination at step 23, the operator is alerted and the cause of the excessive noise is investigated at step 24.

If there is a "yes" determination at step 22, the noise attributes of the seismic data traces of the n$^{th}$ shot are compared amongst themselves at step 25 to determine the consistency of the traces of the n$^{th}$ shot. The noise attributes of the seismic data traces of the n$^{th}$ shot are also compared with the stored values of noise attributes determined for to earlier shots at step 26, to determine the shot consistency. At step 27 the trace consistency attributes and the shot consistency attributes are compared with pre-set thresholds to determine whether the trace consistency and shot consistency attributes are acceptable. If there is a "yes" determination at step 27, the next shot is fired at step 28.

If there is a "no" determination at step 27, it is then determined at step 23 whether the trace consistency and shot consistency attributes nevertheless meet the specifications set down for the seismic data. If there is a "yes" determination at step 23, the next shot is fired at step 28.

If there is a "no" determination at step 23, the operator is alerted, and at step 24 the cause of the lack of consistency of the seismic data is investigated.

In FIG. 8, steps 25 and 26 (determination of the trace consistency attribute and the shot consistency attribute) are carried out in parallel. As noted above, however, these steps could be carried out one after the other.

It is preferable to have the real-time quality control processing of one shot completed before the next shot is fired. In a practical data acquisition system, however, the system will generally arm the next shot before the quality control process on the previous shot has been completed. This "one-shot delay" in the completion of the real-time quality control processing does present the risk that one shot could be wasted, through being fired before the operator is made aware of a problem with the quality of the acquired seismic data of the previous shot. However, the loss of a single shot is generally acceptable in seismic surveying.

Figure 9:
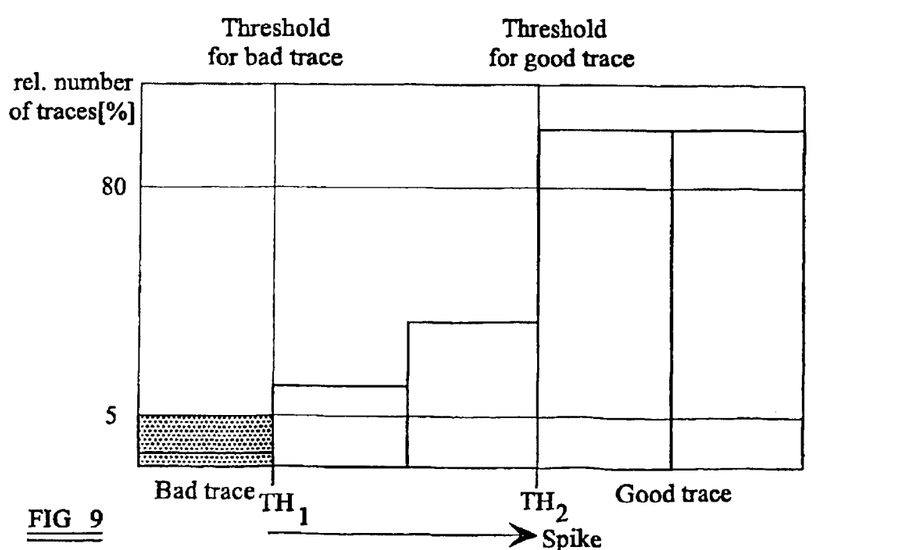
FIG. 9 is a summary of the statistics of attributes generated by a method of the present invention.

Since the noise attributes determined for each seismic data trace are stored, it is possible to produce statistics illustrating the quality of the seismic data. As an example, FIG. 9 is a schematic illustration of a histogram of the values of the noise attribute SPIKE for all seismic data traces in one shot. Traces having a value of the noise attribute SPIKE lower than a first threshold value $TH_1$ are classified as "bad traces", and traces having a value for the noise attribute SPIKE that exceeds a second threshold value $TH_2$ are classified as "good" traces. The bar-chart shows the relative number of traces that are classified as "bad" or "good" traces. An operator can monitor for example, the relative number of "bad" traces, and take action if this exceeds a pre-set threshold such as 5%. The operator can also monitor the relative number of "good" traces and take action if this falls below a pre-set threshold such as 80%.

Similar bar-charts to the one shown in FIG. 9 can be compiled for the other noise attributes LOFRE and HIFRE.

The bar-charts may be continually updated as further shots are recorded, so that an operator can see at once if there is an increase in the number of "bad" traces or a decrease in the number of "good" traces.

The threshold values $TH_1$ and $TH_2$ may be pre-set on the basis of the type of the seismic data signal as deduced from the noise attributes according to table 1.

In FIG. 9 a shot is classified as "bad" or as "good" on the basis of solely one of the noise attributes. It is also possible to classify traces as "good" or "bad" on the basis of a consideration of all three of the noise attributes SPIKE, LOFRE, and HIFRE. For example a trace might be required to meet respective pre-set thresholds for all three noise attributes SPIKE, LOFRE, and HIFRE in order to be classified as a "good" trace.

Although the preferred embodiments of the invention have been described with reference to processing seismic data traces, the invention is not limited to use with seismic data traces.

What is claimed is:

1. A method of monitoring the quality of data comprising the steps of:

sampling a first acquired data trace to determine the amplitude of the trace at a plurality of sampling times; and determining first and second attributes for the acquired first data trace from the sampled amplitudes of the first acquired data trace, the first and second attributes being indicative of the noise content of the first acquired data trace.

2. A method as claimed in claimed in claim 1 and comprising the further step of comparing one of the first and second attributes determined for the first data trace with a predetermined threshold value.

3. A method as claimed in claim 1 or 2 and comprising the further steps of:

sampling a second data trace to determine the amplitude at a plurality of sampling times;

determining the first and second attributes for the second data trace from the sampled amplitudes of the second data trace; and comparing at least one of the first and second attributes determined for the first data trace with the corresponding one(s) of the first and second attributes determined for the second data trace.

4. A method as claimed in claim 1 or claim 2, and further comprising the step of predicting at least one of the first and second attributes of a third data trace from the attributes determined for the first data trace and/or the attributes determined for the second data trace.

5. A method as claimed in claim 1 or claim 2, and further comprising the step of identifying the type of the data represented by the first and/or second data trace from the values of the attributes determined for the first and/or second data trace.

6. A method as claimed in claim 1 or claim 2, and further comprising the step of determining a third attribute indicative of the noise content of the first or second data trace from the sampled amplitudes of the first or second data trace.

7. A method as claimed in claim 1 or claim 2, wherein one of the attributes is indicative of the spike content of a data trace.

8. A method as claimed in claim 1 or claim 2, wherein one of the attributes is indicative of the low frequency content of a data trace.

9. A method as claimed in claim 1 or claim 2, wherein one of the attributes is indicative of the high frequency content of a data trace.

10. A method as claimed in claim 1 or claim 2, wherein the step of determining the attributes of a data trace comprises determining the values of a plurality of functions of the sampled amplitudes of the data trace, and calculating the attributes of the data trace from the values of the functions.

11. A method as claimed claim 1 or claim 2, wherein the data trace is a seismic data trace.

12. A method as claimed in claim 3, wherein the first and second data traces are seismic data traces and were acquired in the same shot.

13. A method as claimed in claim 3, wherein the first and second data traces are seismic data traces and were acquired in different shots.

14. A method as claimed in claim 10 wherein one of the functions is the RMS average of the sampled amplitudes.

15. A method as claimed in claim 10 wherein one of the functions is a function of the derivative with respect to time of the sampled amplitudes.

16. A method as claimed in claim 10 wherein one of the functions is a function of the integral with respect to time of the sampled amplitudes.

17. A method as claimed in claim 10, wherein the step of determining the values of the plurality of functions of the sampled amplitudes comprises determining the four values RMS, MAX, RLOF, and RHIF, where $$RMS = \sqrt{\frac{1}{N}\sum_{i=1}^{N} x_i^2}$$

$$MAX = \sqrt{\max(x_1^2)}$$

$$RLOF = F\sqrt{\frac{1}{N}\sum_{i=1}^{N} (\int x_i dt)^2}$$

$$RHIF = \frac{1}{F}\sqrt{\frac{1}{N}\sum_{i=1}^{N} \left(\frac{d}{dt}x_1\right)^2}$$

where F is the sampling frequency, $x_i$ is the amplitude measured in the $i^{th}$ sampling operation and $1 \leq i \leq N$.

18. A method as claimed in claim 17 wherein the step of determining the attributes indicative of the noise content of the trace comprises determining the attributes:

$$SPIKE = \sqrt{2}RMS/MAX;$$

$$LOFRE = RMS/(RLOF/COR);$$

$$HIFRE = RMS/(RHIF\ COR);$$

where COR=F/(CONST.$f_x$), and $f_x$ is the frequency at which LOFRE=HIFRE.

* * * * *